2 Sheets—Sheet 1.
A. EAMES.
MACHINE FOR DRESSING STONE.
No. 8,652.          Patented Jan. 13, 1852.
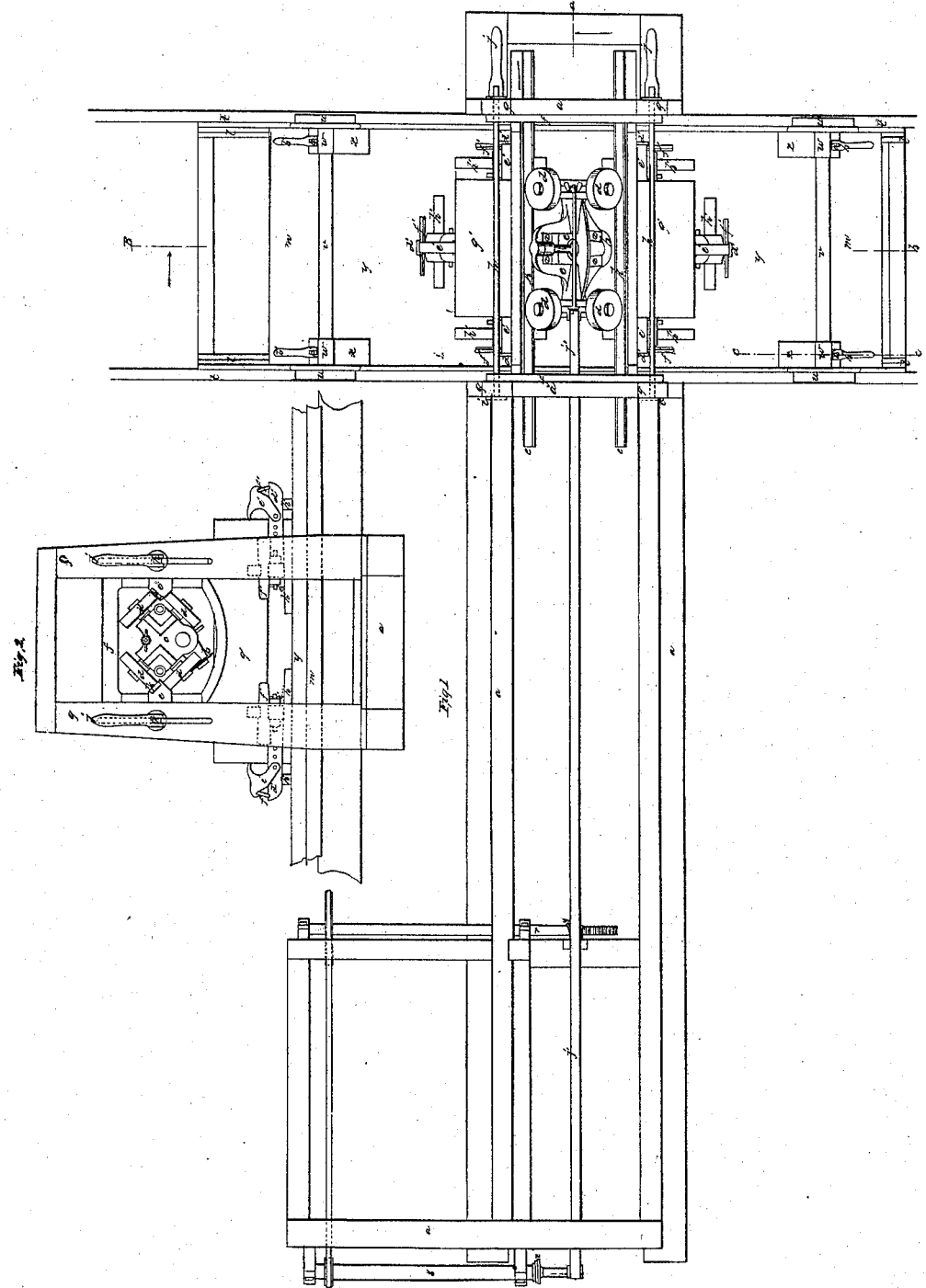

2 Sheets—Sheet 2.
A. EAMES.
MACHINE FOR DRESSING STONE.
No. 8,652. Patented Jan. 13, 1852.
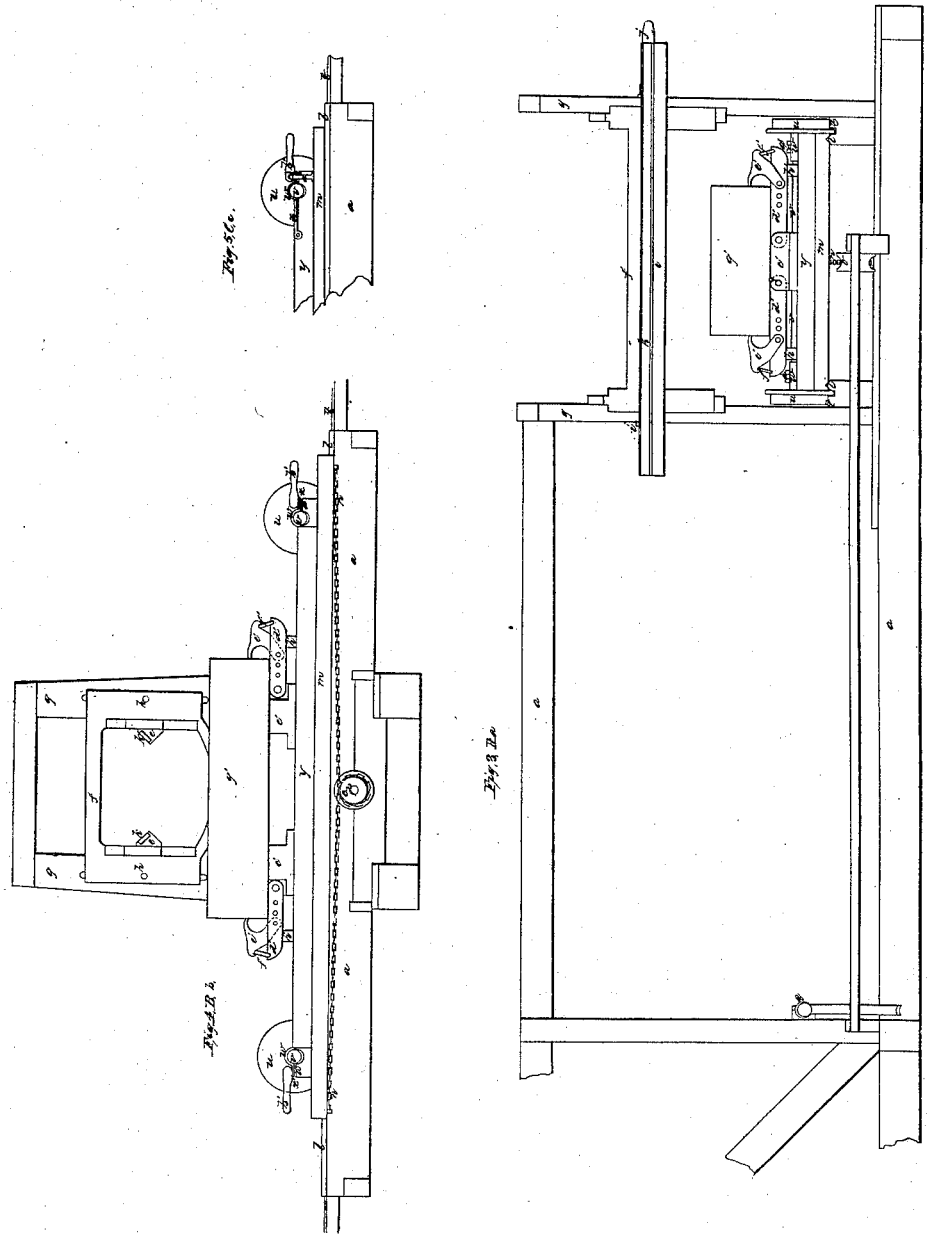

UNITED STATES PATENT OFFICE.

ALBERT EAMES, OF SPRINGFIELD, MASSACHUSETTS, ASSIGNOR TO CHARLES T. SHELTON.

MACHINE FOR DRESSING STONE.

Specification of Letters Patent No. 8,652, dated January 13, 1852.

*To all whom it may concern:*

Be it known that I, ALBERT EAMES, of Springfield, in the State of Massachusetts, have invented certain new and useful Improvements in Machinery for Dressing Stone, and that the following is a full, clear, and exact description thereof, reference being had to the accompanying drawings, making part of this specification, in which—

Figure 1, is a plan; Fig. 2, an end elevation; Figs. 3, 4, and 5, vertical sections taken at the lines A, a, B, b, and C, c, of Fig. 1.

The same letters indicate like parts in all the figures.

My invention relates to improvements on the machine for dressing stone secured by Letters Patent granted to Charles Wilson bearing date the 13th day of March 1847 and reissued 4 March 1857. In the said Wilson machine the arbor of the rollet or cutter is hung to a carriage usually provided with wheels above and below the ways and set at an angle of about 45 degrees which embrace and run on V-formed ways. It is important to the practical working of this machine that the under rollers should run against fixed guides to insure the production of a true face on the stone, and as the dust is liable to lodge on the upper surface of the ways, and clog the working of the machine, much inconvenience has been experienced in its practical operation.

The object of the first part of my invention is to avoid these inconveniences and to this end the nature of it consists in making the upper face of the ways elastic to yield in the working of the carriage.

The second part of my invention relates to the method of bringing the stone to the machine and of removing it and consists in the employment of a carriage provided with two or more pairs of wheels that run on permanent rails the said axles being so connected with the carriage that when the stone is brought under the action of the rollet or cutter it can be let down to slide on ways during the feeding motion and raised up again onto the wheels to draw the stone away from the machine. By this arrangement the carriage with the stone on it can be drawn to and from the machine on wheels, at the same time securing the advantage of steadiness and firmness during the operation of dressing the stone by having the body of the carriage to rest and slide directly on the ways. And the third part of my invention relates to the method of securing the stones onto the carriage and this part of my invention consists in the employment of a series of dogs jointed to bars which bars are jointed to the carriage or to blocks attached thereto, so that by the insertion of wedges under the said bars the block of stone resting thereon can be leveled and by means of other wedges driven between the dogs and the bars the block or blocks of stone can be properly secured and held until it is dressed.

In the accompanying drawings *a* represents a frame adapted to the purpose and *b* the rollet or cutter by the running of which the face of a stone can be dressed. The said rollet is hung on an arbor that runs in appropriate boxes in a carriage *c* provided with journals for eight friction wheels *d*, the axes of four of which are at right angles to the other four and at an angle of 45 degrees with the intended plane of the stone to be dressed.

The wheels of the aforesaid carriage embrace and run on two ways *e*, *e*, attached to and making part of a frame *f*, that slides vertically between the posts *g*, *g*, *g*, *g*, of the main frame for the purpose of adjusting the rollet or cutter to the thickness of the stone to be dressed. This frame it secured in any desired position by means of two bars *h*, *h*, having a head *i* on one end and a cam formed clamping lever *j* on the other so that after the said frame has been brought to the proper elevation it can be clamped and there held in place.

The upper and lower faces of the two ways *e*, *e*, are at right angles and the upper face of each is grooved longitudinally to receive a strip of metal *k*, on which the wheels run, a strip of india rubber being inserted under the said metal strip so as to present an elastic bed for the wheels to run on. In this way it will be seen that the sets of wheels have an elastic medium interposed between them, while the under wheels run against solid unyielding ways.

Below the cutter carriage above described there are two ways *l*, *l*, to which is fitted a movable platform *m* that slides thereon and to this platform are secured the two ends of a chain *n* that is wrapped around a drum *o* on the end of a line shaft *p*, the end of which carries a cog wheel that engages the threads of a worm *q*, on a shaft *r* that receives motion from the driving shaft *s*.

Outside of the ways *l*, *l*, are two other ways $t, t$, on which run flanched wheels $u, u, u, u$, the axles $v, v$, of which run in boxes $w, w, w, w$, on the ends of arms $x, x, x, x$, jointed to a carriage $y$. The outer ends of the said arms $x$ have holes through which pass bolts $a'$ attached to the carriage and jointed at their upper ends to cam formed levers $b'$, so that by turning the said levers $b'$ the carriage $y$ can be let down or raised. The ways $t, t$, extend beyond the platform $m$ to any desired distance so that when the carriage $y$, is raised up it runs on the wheels $z\ z$ and can be moved about at pleasure to any distance to remove or bring a stone and when brought over the platform $m$ it is let down to rest thereon so that the feeding motion during the operation of the cutter for dressing the stone is communicated to the carriage by the platform $m$ on which it rests.

To the top of the carriage are secured two blocks $c', c'$ to which are jointed a series of arms $d'$ to the outer ends of which are jointed dogs $e'$ the arms projecting beyond the dogs sufficiently far and the two being so formed as to admit of the insertion of a wedge $f'$, to force and hold the point of the dog against the block of stone $g'$ when in place. In operating the said machine the carriage $y$ is run to any part of the yard or the ways $t, t$, to receive the stone to be dressed which is put onto the blocks $c', c'$ and then the jointed arms $d'$ are forced up by means of wedges $h'$ until the stone is brought to the required level and then the wedges $f'$ are driven in to force the dogs against the stone to hold it firmly in place.

The carriage with the stone secured to it is then drawn on the ways until one end of the stone comes to the line of action of the cutter which is made to traverse across by a crank $i'$ on the driving shaft and a connecting rod $j'$ extending thence and taking hold of the cutter carriage. The stone carriage $y$ is then let down until it rests on the platform $m$ which imparts to it the feeding motion. After the whole length of the stone has been acted upon the cutter is stopped, the stone carriage lifted up and run back of it be necessary to repeat the operation or the carriage is run off to any part of the yard to deposit the stone. In this way it will be seen that heavy blocks of stone can be received on the carriage in any part of the yard, properly adjusted and secured and brought under the action of the cutter and then delivered with little labor, and that the proper action of the cutter carriage can be secured and protected against accident.

What I claim as my invention and desire to secure by Letters Patent is—

Making the upper surface of the ways elastic, substantially as described, in combination with the cutter carriage constructed and operating in manner substantially as specified and for the purpose described.

2. I also claim the manner substantially as described of mounting the stone carriage on wheeled axles so that it can be elevated and depressed, in combination with the feeding platform running on ways substantially as described, so that the carriage can be run on wheels to bring stones to and remove them from the machine and be let down onto the platform to receive the feed motion as described.

ALBERT EAMES.

Witnesses:
CANSTEN BROWNE,
CHAS. BAMBURGH.